United States Patent
Oe et al.

(10) Patent No.: US 8,220,573 B2
(45) Date of Patent: Jul. 17, 2012

(54) HYBRID VEHICLE

(75) Inventors: Yu Oe, Toyota (JP); Kazunari Izumi, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 366 days.

(21) Appl. No.: 12/450,804

(22) PCT Filed: May 15, 2008

(86) PCT No.: PCT/JP2008/059411
§ 371 (c)(1),
(2), (4) Date: Oct. 14, 2009

(87) PCT Pub. No.: WO2008/143310
PCT Pub. Date: Nov. 27, 2008

(65) Prior Publication Data
US 2010/0140001 A1  Jun. 10, 2010

(30) Foreign Application Priority Data
May 18, 2007 (JP) .................................. 2007-133248

(51) Int. Cl.
*B60W 20/00* (2006.01)

(52) U.S. Cl. .................... 180/65.275; 180/65.21

(58) Field of Classification Search .............. 180/65.25, 180/65.26, 65.27, 65.28, 65.29, 65.285, 65.275; 701/22, 69; 123/525, 672, 179.4, 431; 903/918, 903/905, 907
See application file for complete search history.

(56) References Cited

U.S. PATENT DOCUMENTS

| | | | |
|---|---|---|---|
| 6,223,106 B1 * | 4/2001 | Yano et al. | 701/22 |
| 6,369,531 B1 * | 4/2002 | Oshima et al. | 180/65.26 |
| 6,603,278 B2 * | 8/2003 | Oshima et al. | 701/22 |
| 6,613,465 B2 * | 9/2003 | Yamaoka et al. | 429/423 |
| 6,679,214 B2 * | 1/2004 | Kobayashi et al. | 123/179.4 |
| 6,721,637 B2 * | 4/2004 | Abe et al. | 701/22 |

(Continued)

FOREIGN PATENT DOCUMENTS

JP   A-2000-064875   2/2000

(Continued)

OTHER PUBLICATIONS

Decision on Grant issued in Russian Application No. RU 2009147022/11(066997) dated Jan. 18, 2011 (with translation).

*Primary Examiner* — Hau Phan
(74) *Attorney, Agent, or Firm* — Oliff & Berridge, PLC

(57) ABSTRACT

A hybrid vehicle includes a fuel tank for storing fuel for an engine, a circulation system (a pump), a first path, a pressure regulator, and a second path for circulating the fuel, and a control device (hybrid control unit). When the hybrid vehicle is in a vehicular state that satisfies a predetermined condition, the control device controls the hybrid vehicle so that it performs EV traveling (electrical vehicle traveling) in which wheels are driven by a rotating electrical machine with the engine stopped. When the stop period of the engine is equal to or longer than a predetermined period, the control device drives the circulation system to circulate the fuel.

4 Claims, 8 Drawing Sheets

U.S. PATENT DOCUMENTS

| | | | |
|---|---|---|---|
| 6,814,170 B2 * | 11/2004 | Abe et al. | 180/65.25 |
| 7,159,574 B2 | 1/2007 | Hayashi et al. | |
| 7,316,219 B2 * | 1/2008 | Yamaguchi et al. | 123/431 |
| 7,740,092 B2 * | 6/2010 | Bender | 180/65.29 |
| 7,872,443 B2 * | 1/2011 | Ward | 903/907 |
| 2006/0113129 A1 * | 6/2006 | Tabata | 180/65.2 |
| 2006/0250902 A1 * | 11/2006 | Bender et al. | 369/1 |
| 2008/0223344 A1 * | 9/2008 | Suzuki et al. | 123/525 |
| 2009/0277702 A1 * | 11/2009 | Kanada et al. | 180/65.29 |
| 2010/0038160 A1 * | 2/2010 | Osawa | 180/65.275 |

FOREIGN PATENT DOCUMENTS

| | | |
|---|---|---|
| JP | A-2002-070680 | 3/2002 |
| JP | A-2002-295347 | 10/2002 |
| JP | A-2004-324440 | 11/2004 |
| JP | A-2005-214122 | 8/2005 |
| JP | A-2005-226462 | 8/2005 |
| JP | A-2007-168512 | 7/2007 |
| RU | 2 206 784 C2 | 6/2003 |

* cited by examiner

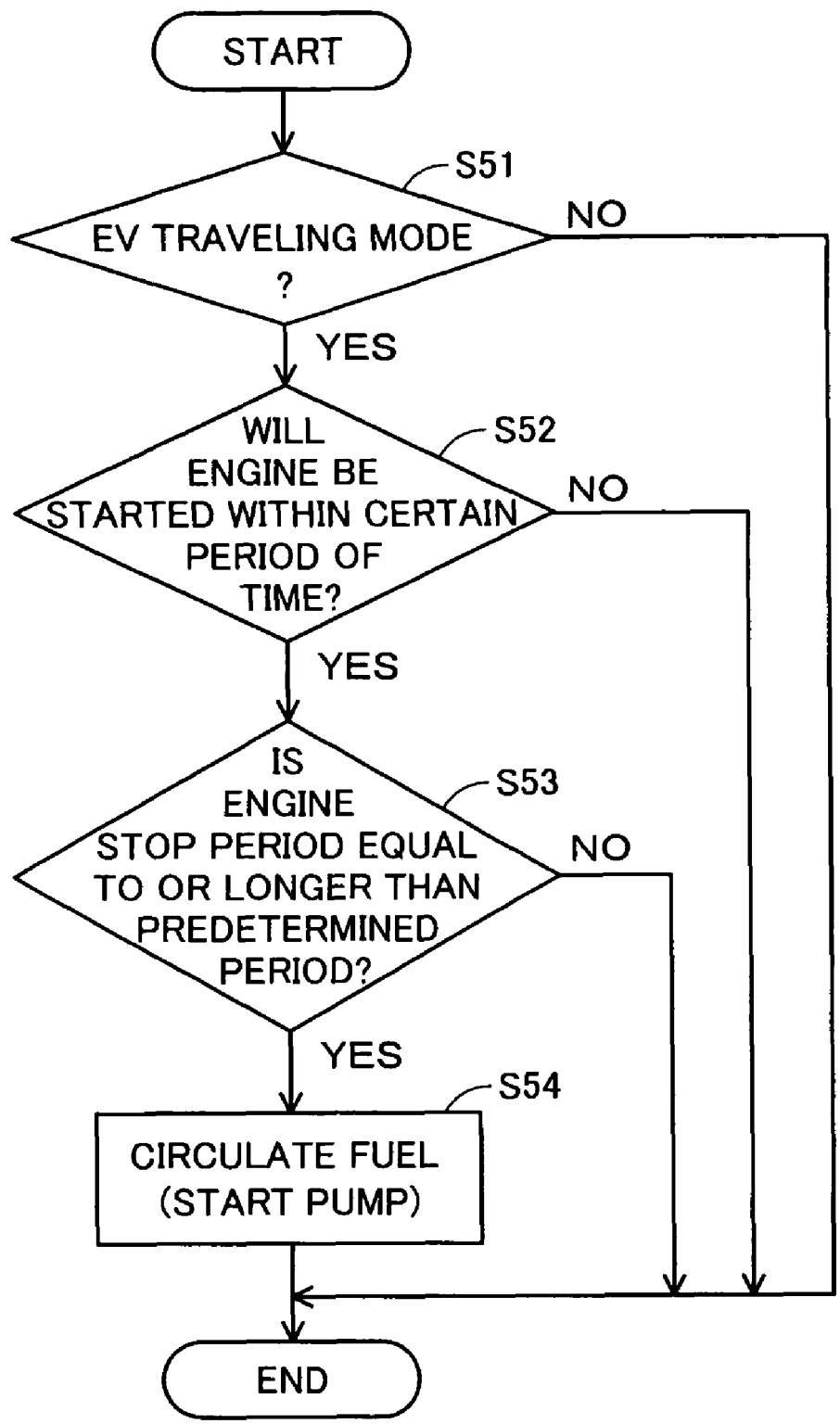

HYBRID VEHICLE

TECHNICAL FIELD

The present invention relates to a hybrid vehicle, and particularly to a hybrid vehicle employing an internal combustion engine and a rotating electrical machine together.

BACKGROUND ART

In recent years, as environmentally friendly vehicles, hybrid vehicles are receiving broad attention. In a hybrid vehicle, in addition to a conventional engine, a power storage device (battery), an inverter, and an electric motor (motor) driven by the inverter serve as a motive power source.

In such a vehicle, if an engine is regularly started but driving time is short, fuel in a fuel tank may be hardly consumed for a long time. In this case, degradation and alteration of fuel may result in deteriorated starting capability of engine and deteriorated emission characteristics.

Japanese Patent Laying-Open No. 2005-226462 discloses a fuel supplying apparatus in which a fuel pump and a path switching means are provided integrally. This fuel supplying apparatus is configured to be switchable between an operating state in which fuel in a fuel tank is supplied to a carburetor and a circulation state in which fuel in the carburetor is returned to the fuel tank. Where the engine is stopped for a long time, the fuel supplying apparatus can be operated to be in the circulation state, to eliminate inconveniences, such as a failure in starting, due to degradation and alteration of fuel for the next engine start.

There is proposed a hybrid vehicle capable of traveling a longer distance using only an output of a motor by charging a direct current electric power supply by means of an external electric power supply. When a user drives such a hybrid vehicle only for a short distance, the engine is more unlikely to operate. If such short distance traveling of the hybrid vehicle is repeated, the engine may be stopped for a long time.

When the stop period of the engine is long, for example, moisture separated from fuel remaining in a pipe may cause rusting in the pipe. Further, progress in degradation of the fuel in the pipe may have an influence over the operation of the engine.

To prevent such a problem, the method disclosed in Japanese Patent Laying-Open No. 2005-226462, i.e., the method for returning all the fuel in the pipe to the fuel tank is conceived. However, according to this method, when the traveling mode of the hybrid vehicle is set at a mode that permits operation of the engine, fuel cannot be supplied to the engine immediately because no fuel is left in the pipe. Accordingly, the engine cannot be started immediately, which may influence the traveling of the hybrid vehicle.

DISCLOSURE OF THE INVENTION

It is an object of the present invention to provide a hybrid vehicle that allows reduction of an influence of fuel over the vehicle when its engine has been stopped for a long time.

In summary, the present invention provides a hybrid vehicle, including a rotating electrical machine for generating torque to drive a wheel; an internal combustion engine for performing at least one of driving of the wheel and supply of motive power to the rotating electrical machine; a fuel tank for storing fuel for the internal combustion engine; a circulation system for taking out the fuel from the fuel tank, and for returning to the fuel tank the fuel thus taken out; and a control device for controlling the hybrid vehicle so that when a state of the hybrid vehicle satisfies a predetermined condition, the hybrid vehicle travels as an electrical vehicle with the wheel driven by the rotating electrical machine while the internal combustion engine is stopped. When the internal combustion engine has been stopped for the predetermined period or longer, the control device drives the circulation system to circulate the fuel.

Preferably, the control device drives the circulation system while the hybrid vehicle travels as an electrical vehicle.

More preferably, when the control device expects that there is a need for start of the internal combustion engine based on the state of the hybrid vehicle, the control device causes the circulation system to operate.

Preferably, the hybrid vehicle further includes a power storage device charged with electric power supplied from a power supply provided externally to the hybrid vehicle, and for supplying electric power to the rotating electrical machine.

Thus, according to the present invention, the influence of fuel over the vehicle can be reduced when the stop period of the engine mounted on the hybrid vehicle is long.

BRIEF DESCRIPTION OF THE DRAWINGS

FIG. 8 is a flowchart illustrating a fuel circulating process according to a third embodiment.

BEST MODES FOR CARRYING OUT THE INVENTION

Hereinafter reference will be made to the drawings to describe the present invention in embodiments. Note that in the figures, identical or corresponding components are identically denoted and will not be described repeatedly in detail.

First Embodiment

Figure 1:
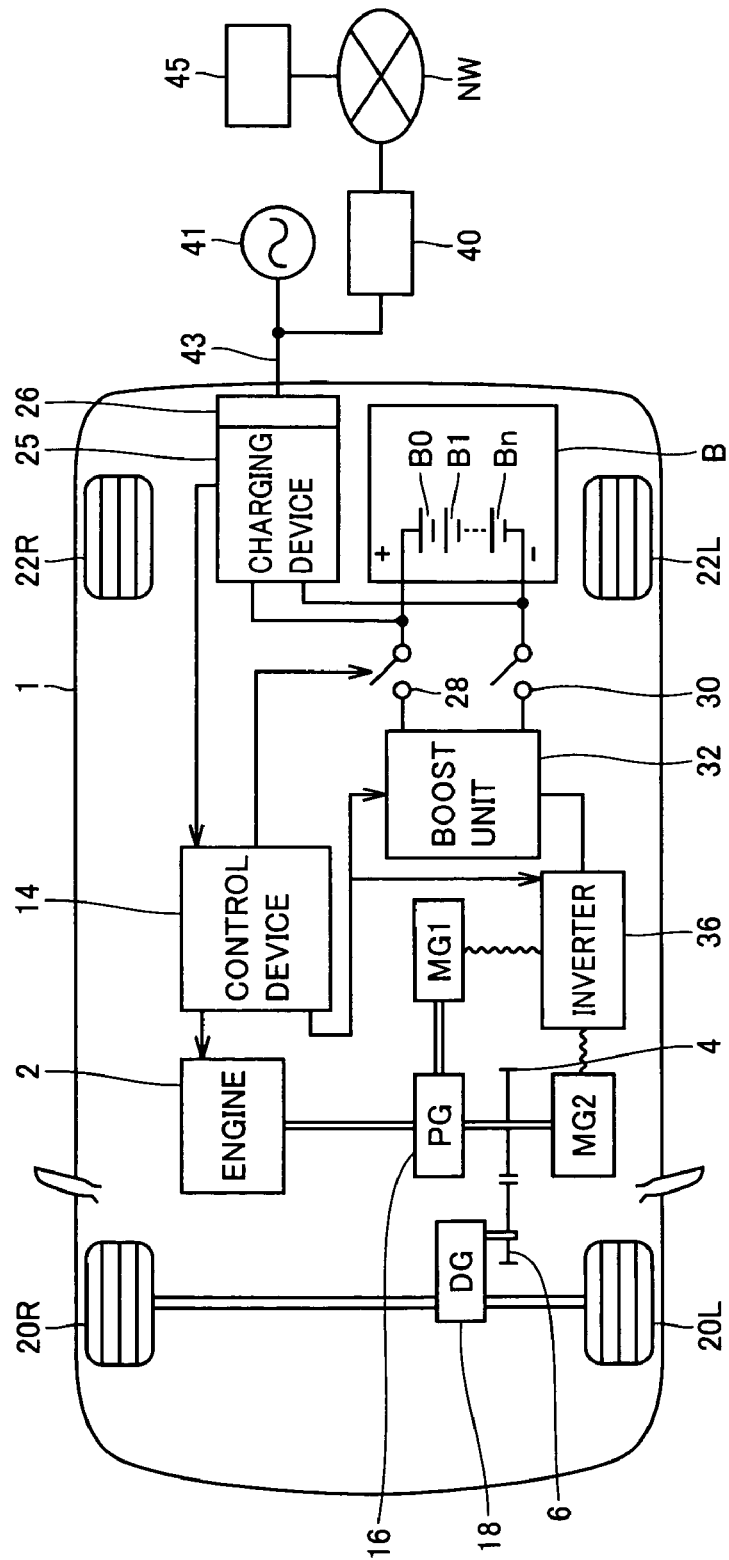
FIG. 1 shows a main configuration of a hybrid vehicle 1 according to a first embodiment.

FIG. 1 shows a main configuration of a hybrid vehicle 1 according to a first embodiment. As described below, hybrid vehicle 1 is a vehicle having an engine and a motor as a motive power source.

With reference to FIG. 1, hybrid vehicle 1 includes front wheels 20R and 20L, rear wheels 22R and 22L, an engine 2, a planetary gear 16, a differential gear 18, and gears 4 and 6.

Hybrid vehicle 1 further includes a battery B, a boost unit 32 boosting in voltage a direct current (dc) electric power output from battery B, an inverter 36 communicating the dc electric power with boost unit 32, a motor generator MG1 coupled with engine 2 via planetary gear 16 to mainly generate electrical power, and a motor generator MG2 having a rotation shaft connected to planetary gear 16. Inverter 36 is connected to motor generators MG1 and MG2 to provide conversion between alternate current (ac) electric power and dc electric power provided from boost unit 32.

Planetary gear 16 has first, second and third rotation shafts connected to engine 2, motor generator MG1, and motor generator MG2, respectively.

The third rotation shaft has gear 4 attached thereto, and gear 4 drives gear 6 to transfer motive power to differential gear 18. Differential gear 18 receives the motive power from gear 6 and transmits the motive power to front wheels 20R and 20L, and also receives rotary force of front wheels 20R and 20L and transmits it via gears 6 and 4 to the third rotation shaft of the planetary gear.

Planetary gear 16 serves to split motive power between engine 2 and motor generators MG1 and MG2. More specifically, when rotation of two of the three rotation shafts of planetary gear 16 is determined, that of the remaining one rotation shaft will naturally be determined. Accordingly, engine 2 is operated in a most efficient range while the amount of electric power generated by motor generator MG1 is controlled, and motor generator MG2 is driven to control vehicular speed, to realize a generally energy-efficient vehicle.

A reduction gear may be provided to reduce the rotation of motor generator MG2 and transmit it to planetary gear 16, and a transmission gear may be provided to allow the reduction gear to have a variable reduction ratio.

Battery B, serving as a power storage device, is implemented for example by a nickel metal hydride, lithium ion, or similar secondary battery, and supplies dc electric power to boost unit 32 and is also charged with dc electric power provided from boost unit 32. It should be noted that the power storage device mounted on hybrid vehicle 1 may be, for example, an electric double layer capacitor.

Boost unit 32 boosts dc voltage received from battery B and supplies the boosted dc voltage to inverter 36. Inverter 36 receives the supplied dc voltage and converts it to ac voltage, and controls driving motor generator MG1 when the engine is started. Furthermore, after the engine is started, ac electric power generated by motor generator MG1 is converted by inverter 36 to a direct current and converted by boost unit 32 to a voltage suitable for charging battery B, and battery B is thus charged.

Furthermore, inverter 36 drives motor generator MG2. Motor generator MG2 assists engine 2 to drive front wheels 20R and 20L. In braking the vehicle, the motor generator regeneratively operates to convert the rotary energy of the wheels to electrical energy. The obtained electrical energy is returned via inverter 36 and boost unit 32 to battery B. Battery B is a battery pack including a plurality of series-connected cell units B0-Bn. Between boost unit 32 and battery B, system main relays 28, 30 are provided to disconnect high voltage when the vehicle is not operated.

Hybrid vehicle 1 further includes a charging device 25 and a connector 26. A cable 43 is connected to an ac electric power supply 41 disposed externally to hybrid vehicle 1, and connector 26. Ac voltage (for example, AC 100V) from ac electric power supply 41 is provided to charging device 25 via cable 43 and connector 26. Charging device 25 converts the ac voltage provided from ac electric power supply 41, into dc voltage suitable for charging battery B, and supplies the dc voltage to battery B.

Not only ac electric power supply 41 but also a terminal device 40 is connected to cable 43. Terminal device 40 obtains information from a server 45 via a network NW and outputs it to cable 43. Via cable 43, charging device 25 receives the information (the information transmitted by server 45), and outputs it to a control device 14. The information may include, for example, date and time of start of charging hybrid vehicle 1.

Hybrid vehicle 1 further includes control device 14. Control device 14 controls engine 2, inverter 36, boost unit 32, and system main relays 28, 30, in accordance with a driver's instruction and an output from various sensors attached to the vehicle.

As shown in FIG. 1, hybrid vehicle 1 can be charged externally. Specifically, hybrid vehicle 1 has battery B supplying electric power to motor generators MG1, MG2, and connector 26 allowing battery B and ac electric power supply 41 to be electrically connected in order to charge battery B externally to the vehicle. It should be noted that charging device 25 is not limited to be provided within hybrid vehicle 1 as described above but may be provided externally to hybrid vehicle 1.

Figure 2:
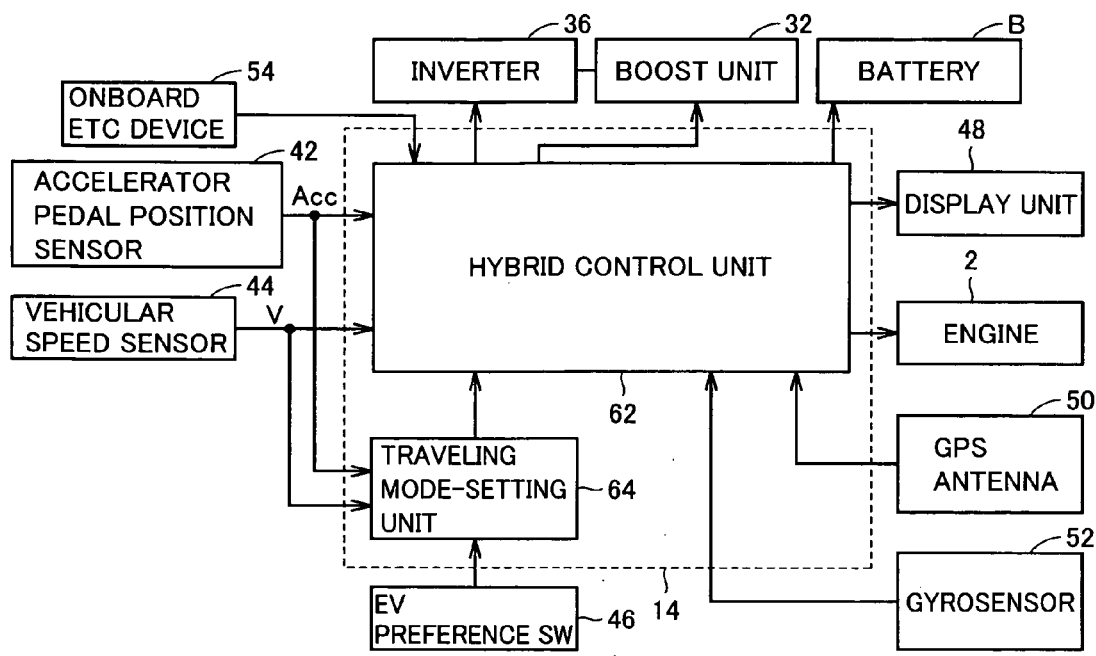
FIG. 2 is a functional block diagram showing a control device 14 of FIG. 1 and peripherals associated with control device 14.

FIG. 2 is a functional block diagram showing control device 14 of FIG. 1 and peripherals associated with control device 14. It should be noted that control device 14 is implementable by hardware or software.

With reference to FIG. 2, control device 14 includes a hybrid control unit 62 and a traveling mode-setting unit 64. Hybrid control unit 62 determines a state of charge (SOC) of battery B by accumulation of charge/discharge currents of battery B, or the like. Hybrid control unit 62 controls a throttle for engine 2 and detects the engine speed of engine 2.

Hybrid control unit 62 obtains information of a destination set by a vehicle occupant, from a display unit 48 including a touch display. Hybrid control unit 62 recognizes the current position of the vehicle through a GPS antenna 50 and a gyrosensor 52, overlays the current position on road map data, and displays it on display unit 48. Furthermore, hybrid control unit 62 performs a navigation operation to search for a traveling route from the current position to the destination and display it. It should be noted that GPS antenna 50 and gyrosensor 52 constitute a navigation system for obtaining information of the current position of hybrid vehicle 1.

Hybrid control unit 62 calculates a power (requested power) that the driver requests from a signal Acc output from an accelerator pedal position sensor 42 and vehicular speed V detected by a vehicular speed sensor. Hybrid control unit 62 calculates required driving power (or total power) with the driver's requested power and in addition thereto battery B's state of charge SOC considered, and furthermore calculates speed that the engine is required to achieve and power that the engine is required to output. Hybrid control unit 62 controls the throttle for engine 2 based on the required speed and the required power.

Hybrid control unit 62 calculates a driver's requested torque according to the traveling state of the vehicle, causes inverter 36 to drive motor generator MG2, and causes motor generator MG1 to generate electric power as required.

The driving power of engine 2 is split into a component for directly driving a wheel and a component for driving motor generator MG1. The sum of driving power of motor generator MG2 and the component generated by the engine for the directly driving serves as driving power of the vehicle. Specifically, in the present embodiment, engine 2 is not only to drive just the vehicle but also is to drive motor generator MG1 to supply motive power to motor generator MG2. This "motive power" is output from engine 2 as a mechanical motive power, and is converted by motor generator MG1 from the mechanical motive power to electric power for driving of motor generator MG2.

When the driver presses an EV (electrical vehicle) preference switch 46, the operation of engine 2 is restrained. This sets the traveling mode of the vehicle at an EV traveling mode (electrical vehicle traveling mode) in which the vehicle travels using only driving power of motor generator MG2. The EV traveling mode is suitable for reducing noise while traveling in a dense residential area late at night or early in morning, and reducing exhaust gas in an indoor parking lot or garage. In contrast, a normal traveling mode in which the engine is operated will hereinafter be referred to as an HV (hybrid vehicle) traveling mode.

The EV traveling mode is automatically deactivated when any of the following conditions is satisfied: 1) EV preference switch 46 is turned off, 2) state of charge SOC of the battery goes below a predetermined value, 3) the vehicular speed reaches or exceeds a predetermined value (for example, 55 km/h), and 4) accelerator pedal position reaches or exceeds a defined value.

Traveling mode-setting unit 64 sets the traveling mode of hybrid vehicle 1 to either one of the EV traveling mode and the HV traveling mode, based on output signal Acc provided from accelerator pedal position sensor 42, vehicular speed V detected by vehicular speed sensor 44, and information sent from EV preference switch 46 and indicating whether or not the driver has selected the EV traveling mode. This information is, in other words, information indicative of "a vehicular state of hybrid vehicle 1". Traveling mode-setting unit 64 sends to hybrid control unit 62 information indicating the set traveling mode. Based on the information received from traveling mode-setting unit 64, hybrid control unit 62 controls engine 2, and controls inverter 36 to control the operation of motor generator MG2.

Specifically, control device 14 is a control device for controlling hybrid vehicle 1 so that it performs EV traveling in which the wheels are driven by motor generator MG2 with engine 2 stopped, if the vehicular state satisfies a predetermined condition.

Further, hybrid control unit 62 receives information from an onboard ETC (Electronic Toll Collection system) device 54. To use onboard ETC device 54, an ETC card issued from a credit card company or the like is inserted thereto. An owner of this ETC card is identified as a payer and a payee. Onboard ETC device 54 wirelessly communicates information regarding a toll, with an antenna deployed as an infrastructure.

In many cases, an antenna with which onboard ETC device 54 is to communicate is provided in an entrance to an expressway. Onboard ETC device 54 transmits to hybrid control unit 62 information indicating that onboard ETC device 54 has made communication with the antenna. Specifically, onboard ETC device 54 is a detection device detecting existence of an entrance (tollgate) of an expressway in which hybrid vehicle 1 is to travel. From onboard ETC device 54, hybrid control unit 62 receives information indicating that the entrance to the expressway has been detected.

Figure 3:
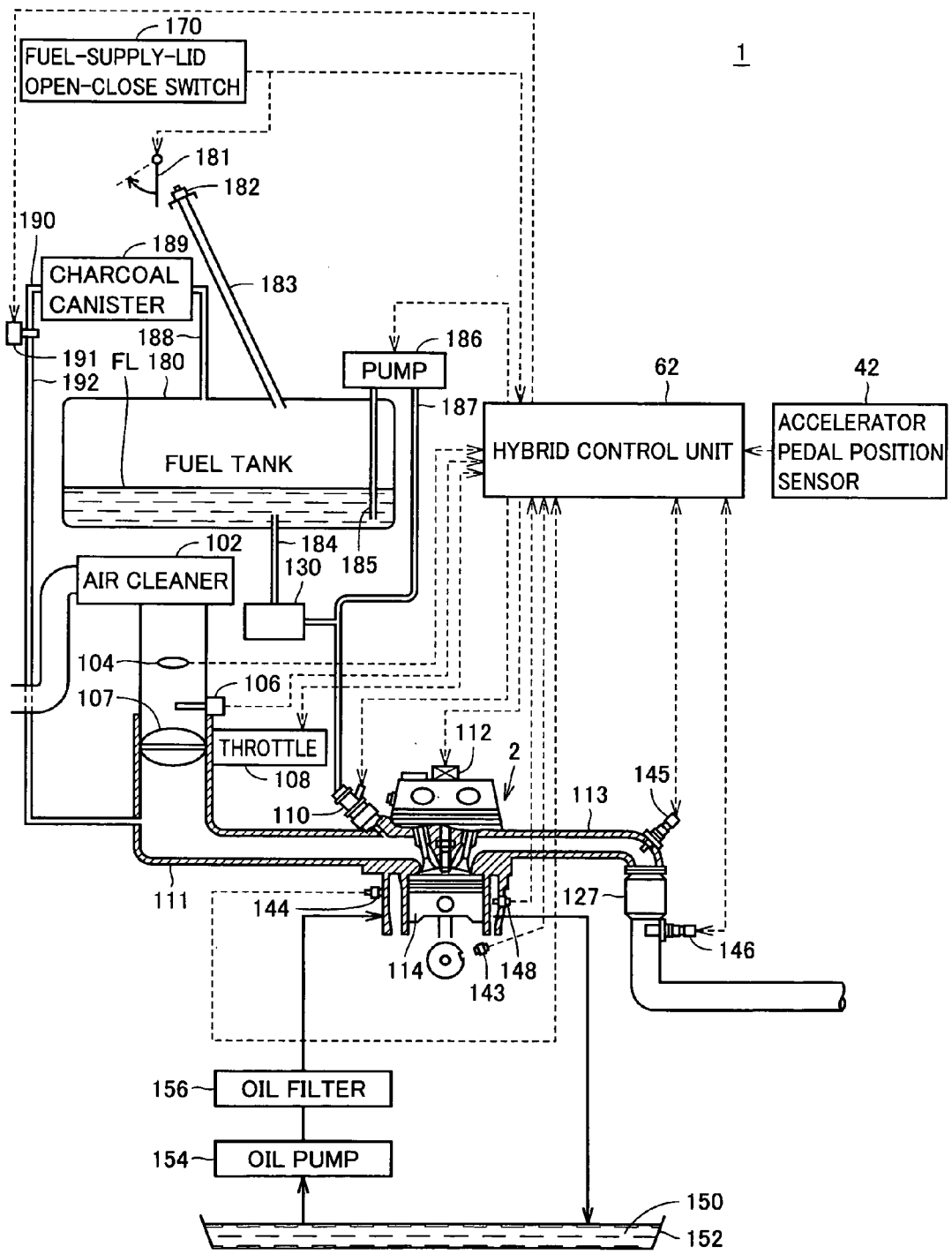
FIG. 3 is a schematic diagram for describing the surroundings of an engine 2.

FIG. 3 is a schematic diagram for describing the surroundings of engine 2. With reference to FIG. 3, hybrid vehicle 1 has engine 2. Engine 2 includes an intake path 111 for introducing intake air into a cylinder head, and an exhaust path 113 for exhausting air from the cylinder head.

From the upstream of intake path 111, an air cleaner 102, an air flow meter 104, an intake air temperature sensor 106, and a throttle valve 107 are provided in this order. Throttle valve 107 has an angle controlled by an electronic control throttle 108. Provided near the intake valve of intake path 111 is an injector 110 for injecting fuel.

In exhaust path 113, from the side of the exhaust valve, an air-fuel ratio sensor 145, a catalyst device 127, and an oxygen sensor 146 are disposed in this order. Further, engine 2 includes a piston 114 moving up and down a cylinder provided in a cylinder block, a crank position sensor 143 detecting rotation of a crankshaft caused as piston 114 moves up and down, a knock sensor 144 detecting occurrence of knocking by detecting vibration of the cylinder block, and a water temperature sensor 148 attached to a coolant passage of the cylinder block.

Further, hybrid vehicle 1 has hybrid control unit 62 and accelerator pedal position sensor 42. According to an output of accelerator pedal position sensor 42, hybrid control unit 62 controls electronic control throttle 108 to change an amount of intake air. Also, according to a crank angle obtained from crank position sensor 143, hybrid control unit 62 sends an ignition instruction to ignition coil 112, and outputs to injector 110 a fuel injection timing. Further, hybrid control unit 62 corrects a fuel injection amount, an air amount, and an ignition timing, in accordance with outputs of intake air temperature sensor 106, knock sensor 144, air-fuel ratio sensor 145, and oxygen sensor 146.

Hybrid vehicle 1 further includes a fuel tank 180 for storing fuel FL, a pump 186, a pressure regulator 130, a charcoal canister 189, and a canister purge vacuum switching valve 191.

Hybrid control unit 62 controls pump 186 to operate and stop. Pump 186 pumps up fuel FL through a path 185, pressure is applied thereto, and fuel FL is supplied to a path 187. When injector 110 is opened at a predetermined timing, fuel FL is injected into intake path 111. In the case of circulating fuel FL, hybrid control unit 62 controls pump 186 to raise the pressure on fuel FL to be supplied to path 187, and hybrid control unit 62 controls injector 110 so that it does not inject the fuel. Accordingly, fuel FL sent from pump 186 to path 187 is brought to pressure regulator 130 and path 184, and then returns to fuel tank 180. It should be noted that pump 186, path 187, pressure regulator 130, and path 184 constitute a circulation system for circulating fuel FL.

It should be also noted that pump 186 is driven independently of the engine, and is, for example, an electric pump or the like.

Fuel vapor, resulting from vaporization of fuel in fuel tank 180, is passed through path 188, and is adsorbed in an activated charcoal provided within charcoal canister 189. The adsorbed fuel vapor is discharged into intake path 111 via paths 190, 192 when canister purge VSV (vacuum switching valve) 191 is opened by hybrid control unit 62.

When the driver operates a fuel-supply-lid open-close switch 170, lid 181 is opened. With a fuel cap 182 detached, fuel FL is supplied from a fuel supplying apparatus such as one in a gas station or the like to a fuel supply path 183.

Under engine 2, an oil pan 152 is provided to store engine oil 150 (lubricating oil). Engine oil 150 is pumped up by an oil pump 154. Engine oil 150 pumped up by oil pump 154 is passed through an oil filter 156 for adsorption of a foreign substance contained therein, and is supplied to each component of engine 2. Oil pump 154 may be a pump using driving power of engine 2 to discharge oil into an oil path, or may be an electric pump. The oil supplied to each component of engine 2 drops through a clearance within engine 2 or flows down along an inner wall of engine 2, to return to oil pan 152. FIG. 3 schematically illustrates circulation of engine oil 150.

In hybrid vehicle 1 shown in FIG. 1, with a larger capacity of battery B, the range of electrical vehicle traveling can be increased. However, for example, if hybrid vehicle 1 repeats traveling short distances, only motor generator MG2 is more likely to be used in driving the vehicle. In other words, the stop period of engine 2 may be longer.

When the stop period of the engine continues for a long time, for example, moisture separated from fuel remaining in a pipe, and ion exchange between the inner wall of the pipe and the fuel may cause rusting in the pipe. Such rusting in the pipe may result in, for example, a crack in the pipe and blockage in the fuel path. In addition, it is considered that a change in a property (for example, viscosity) of fuel makes it impossible to appropriately inject fuel from injector 110. In this case, the engine's starting capability is expected to be deteriorated.

To prevent such a problem, the method for returning all the fuel in the pipe to the fuel tank is conceived. However, according to this method, if the engine has been stopped for a long time, it takes a long time to supply fuel to the engine upon engine restart, resulting in deteriorated starting capability of the engine.

In the first embodiment, when the stop period of engine 2 is equal to or longer than a predetermined period, hybrid control unit 62 starts pump 186 to circulate fuel FL. This prevents separation of moisture from the fuel, so rusting in the pipe can be prevented. Further, a property of fuel FL can be prevented from being changed while keeping fuel FL in the pipe, whereby the engine's starting capability can be prevented from being deteriorated.

Figure 4:
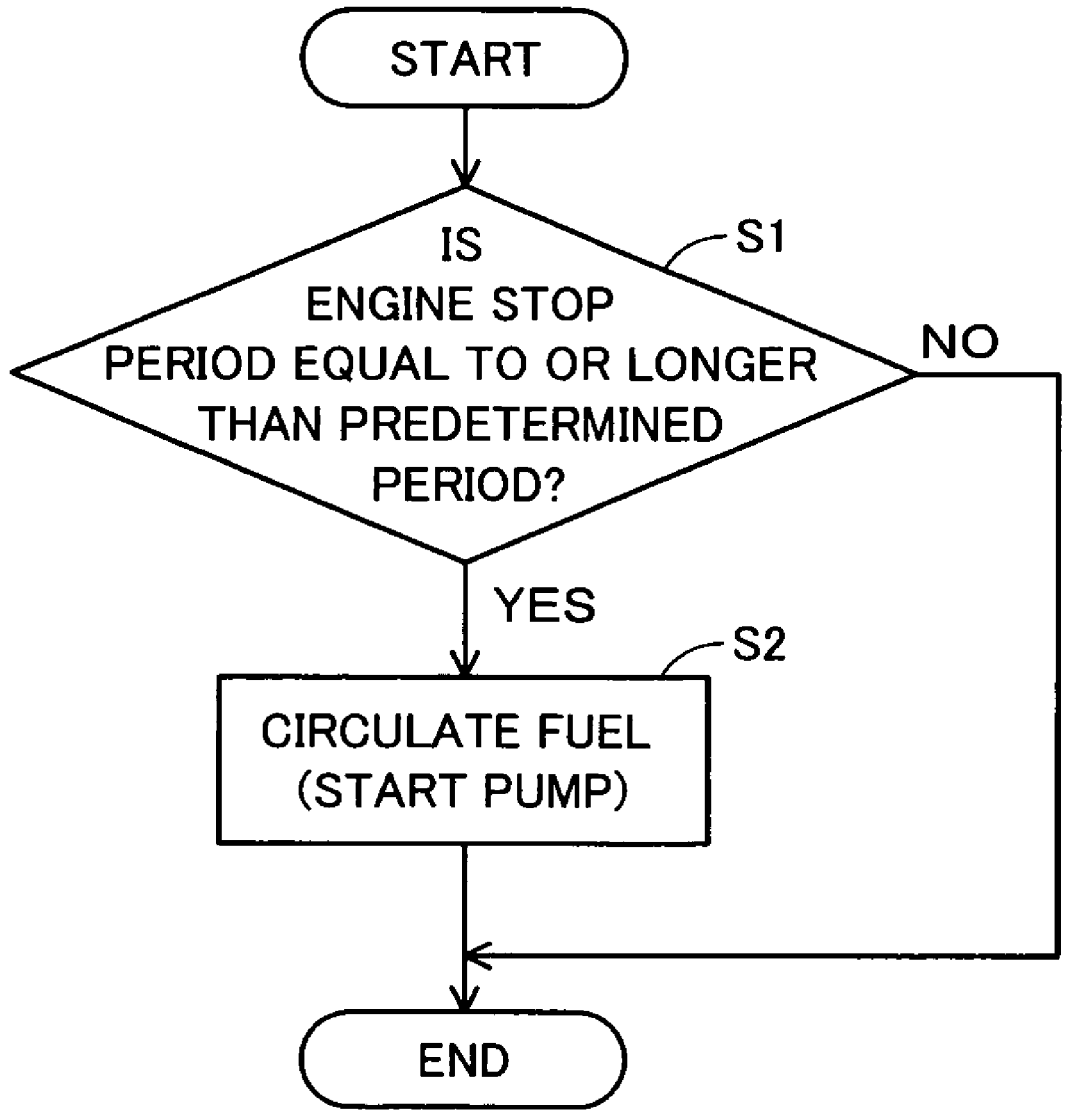
FIG. 4 is a flowchart showing a fuel circulating process according to the first embodiment.

FIG. 4 is a flowchart illustrating a fuel circulating process according to the first embodiment. With reference to FIG. 4 and FIG. 2, when the process starts, hybrid control unit 62 determines whether or not the engine stop period is equal to or longer than the predetermined period (step S1). This "predetermined period" is determined by, for example, an experiment or design. If the engine stop period is equal to or longer than the predetermined period (YES in step S1), hybrid control unit 62 starts pump 186 to circulate fuel FL (step S2). If the engine stop period is shorter than the predetermined period (NO in step S1), the whole process is terminated.

Now, how hybrid control unit 62 of FIG. 2 calculates the engine stop period will be explained. When the engine is stopped, hybrid control unit 62 starts counting of the engine stop period. Hybrid control unit 62 determines that engine 2 is stopped, if, for example, engine speed is 0.

When starting to charge battery B, hybrid control unit 62 obtains a charge start time from server 45. In addition, terminal device 40 transmits to hybrid control unit 62 date and time information obtained from server 45 at a constant time interval. When hybrid control unit 62 receives no date and time information for a predetermined period (for example, one minute), it is determined that charging of battery B has ended. It should be noted that during the charging period of battery B, hybrid control unit 62 may measure the engine stop period by performing the counting process for itself, or may calculate the engine stop period based on the date and time information received from server 45. When the charging of battery B has ended, hybrid control unit 62 continues the measurement of the engine stop period by performing the counting process.

Thus, according to the first embodiment, hybrid vehicle 1 includes: motor generator MG2 for generating torque to drive the wheels of hybrid vehicle 1; engine 2 operated to perform at least one of driving of the wheels and supply of motive power to the motor generator MG2; fuel tank 180 for storing fuel FL for engine 2; a circulation system (pump 186, path 187, and pressure regulator 130) for circulating the fuel; and control device 14 for controlling hybrid vehicle 1 so that when the vehicular state of hybrid vehicle 1 satisfies a predetermined condition, it performs the EV traveling with the wheels driven by motor generator MG2 while engine 2 is stopped. When the stop time of engine 2 is equal to or longer than the predetermined period, control device 14 drives the circulation system to circulate fuel FL.

In this way, according to the first embodiment, it is possible to reduce an influence of the fuel over the vehicle (more particularly, the engine or the fuel pipe) even if engine 2 has been stopped for a long time.

Particularly, it is expected that the EV traveling mode is frequently selected during traveling of the hybrid vehicle shown in FIG. 1 (a vehicle that can be charged from an external source to travel a relatively long distance in the EV traveling mode). In other words, it is expected that the engine is more likely to be stopped for a long time. According to the first embodiment, in such a hybrid vehicle, an influence of the fuel on the vehicle can be prevented.

Second Embodiment

In the first embodiment, the control device obtains the information indicating the date and time of start of charging, from server 45 via network NW, terminal device 40, and charging device 25. In a second embodiment, the engine stop period is calculated in a way different from the first embodiment.

Figure 5:
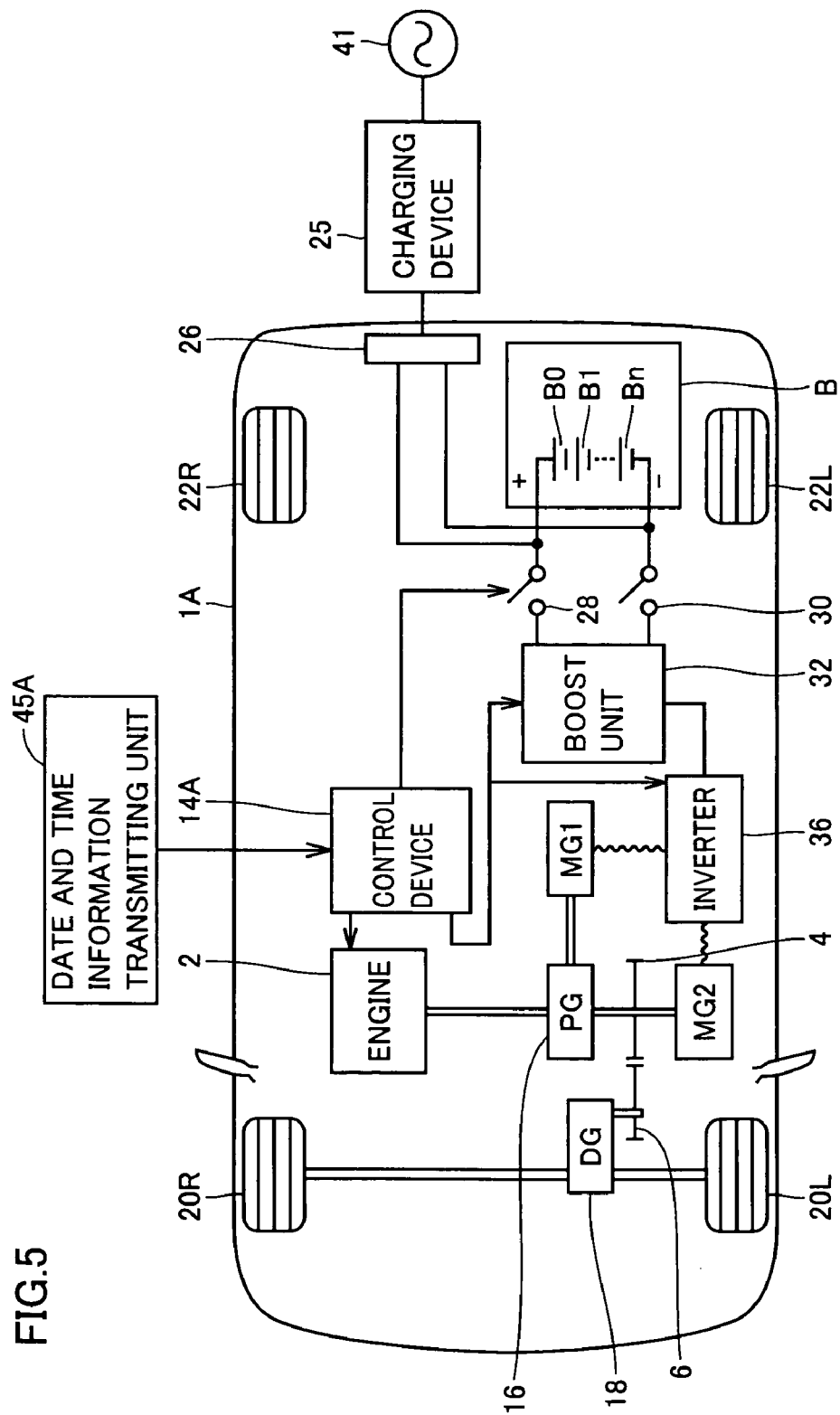
FIG. 5 shows a main configuration of a hybrid vehicle 1A according to a second embodiment.

FIG. 5 shows a main configuration of a hybrid vehicle 1A according to the second embodiment. With reference to FIG. 5, a connector 26 is provided within hybrid vehicle 1A and charging device 25 is provided externally to hybrid vehicle 1A. Dc voltage from charging device 25 is directly input to battery B. In this regard, hybrid vehicle 1A is different from hybrid vehicle 1 of FIG. 1.

A further difference from hybrid vehicle 1 of FIG. 1 lies in that hybrid vehicle 1A has a control device 14A instead of control device 14. Control device 14A receives date and time information (information indicative of the current time) transmitted from a date and time information transmitting unit 45A. It should be noted that a method and form of transmitting the date and time information is not particularly limited. For example, date and time information transmitting unit 45A is a broadcast station (or a transmission antenna) transmitting a radio broadcast radiowave or a television broadcast radiowave. By receiving the radio broadcast radiowave or the television broadcast radiowave, control device 14A obtains the information indicating the current date and time. In another example, date and time information transmitting unit 45A is a transmission station transmitting a radiowave (radiowave signal including time information) to be received by a radiowave clock. By receiving the radiowave from the transmission station, control device 14A may obtain the date and time information.

Since configurations of the other parts of hybrid vehicle 1A are the same as those of the corresponding parts of hybrid vehicle 1, explanation thereof will not be repeated below. Also, since a fuel circulating process performed by control device 14A is the same as the fuel circulating process according to the first embodiment, explanation thereof will not be repeated below.

Figure 6:
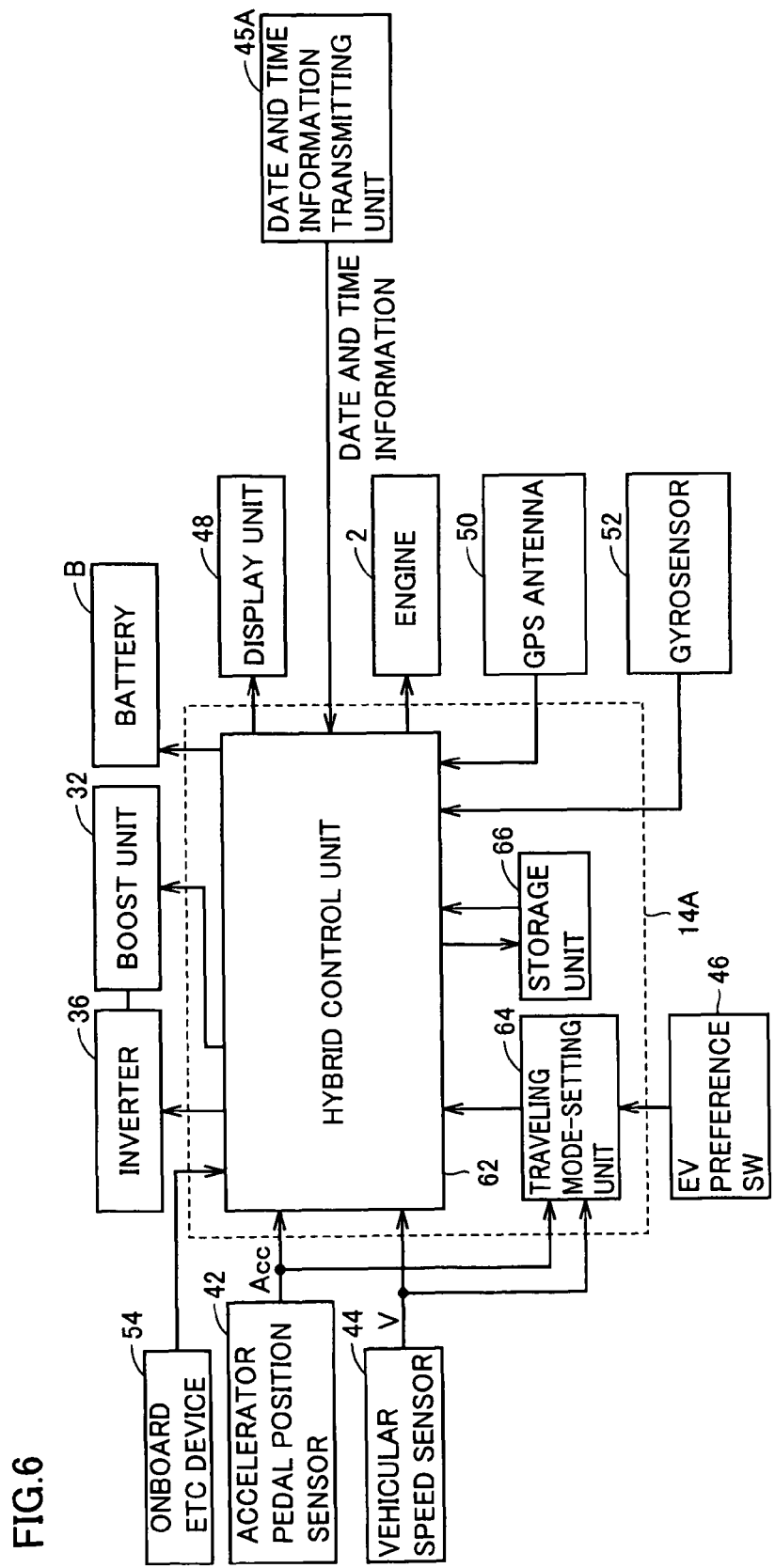
FIG. 6 is a functional block diagram of a control device 14A shown in FIG. 5.

FIG. 6 is a functional block diagram illustrating control device 14A shown in FIG. 5. With reference to FIG. 6 and FIG. 2, control device 14A is different from control device 14 in that control device 14A further includes a storage unit 66. As shown in FIG. 6, hybrid control unit 62 receives date and time information from date and time information transmitting unit 45A. Hybrid control unit 62 causes storage unit 66 to store the date and time information.

Storage unit 66 keeps the date and time information even when hybrid vehicle 1A is given a stop instruction. For example, storage unit 66 is configured to include a nonvolatile memory device (for example, flash memory). Alternatively, for example, storage unit 66 may be a volatile semiconductor memory to which electric power is supplied from a backup electric power supply (not shown). It should be noted that since configurations of other parts of control device 14A are the same as those of corresponding parts of control device 14, explanation thereof will not be repeated below.

Hybrid control unit 62 receives date and time information sent from date and time information transmitting unit 45A when the engine is stopped. Then, hybrid control unit 62 causes storage unit 66 to store the date and time information obtained when hybrid vehicle 1A has stopped. Accordingly, even if hybrid vehicle 1A is stopped after the traveling mode of hybrid vehicle 1A is switched from the HV traveling mode to the EV traveling mode, the date and time information obtained at the moment of the engine stop is stored in storage unit 66.

Next, hybrid control unit 62 receives date and time information sent from date and time information transmitting unit 45A, for example, whenever a fixed period of time elapses. Hybrid control unit 62 calculates the engine stop period based on the date and time information obtained from date and time information transmitting unit 45A and the date and time information stored in storage unit 66. Because the date and time information indicating the date and time of the engine stop is stored in storage unit 66, the engine stop period can be accurately calculated.

Figure 7:
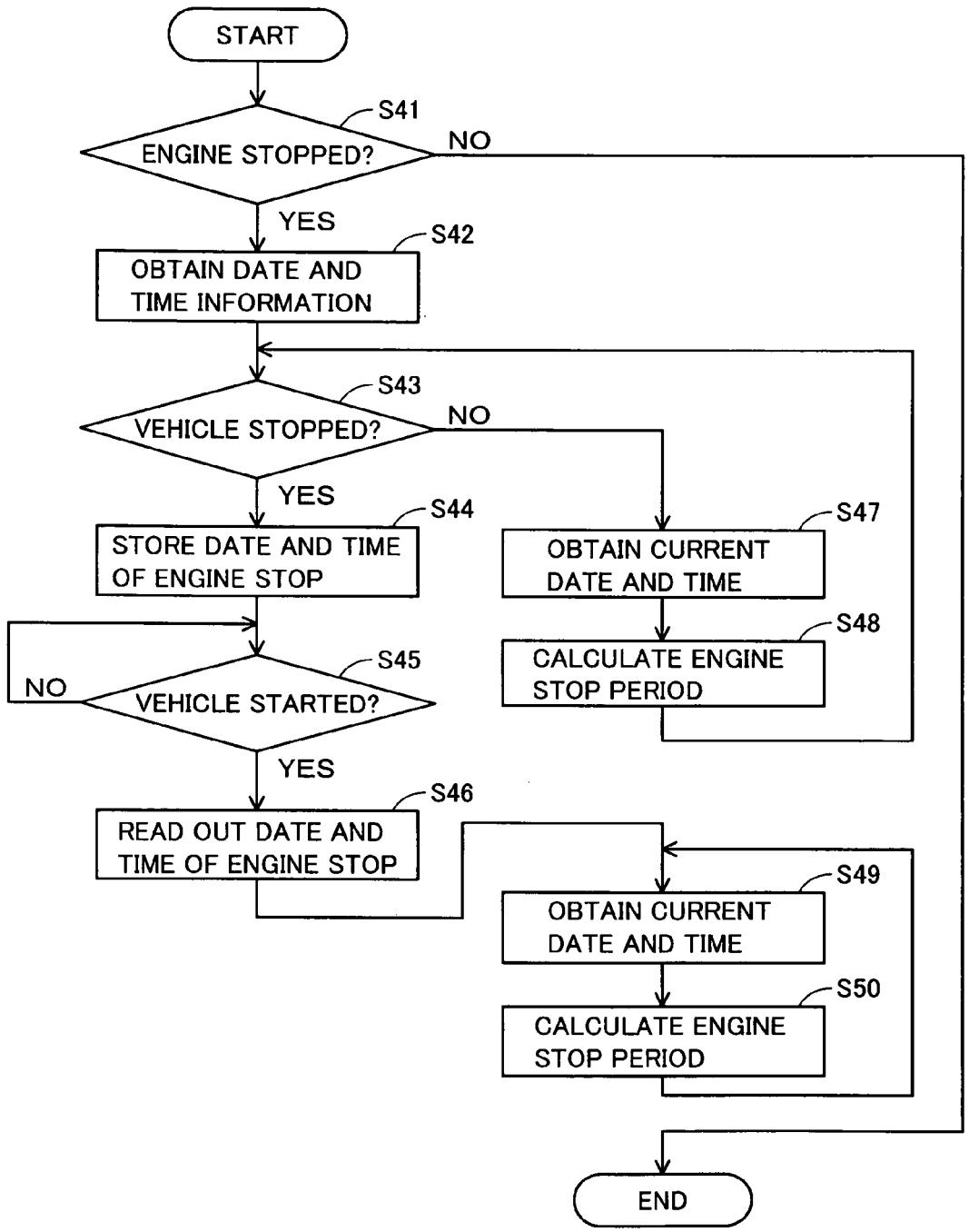
FIG. 7 is a flowchart for describing a process performed by a hybrid control unit 62 shown in FIG. 6 to calculate an engine stop period.

FIG. 7 is a flowchart for describing a process performed by hybrid control unit 62 of FIG. 6 to calculate the engine stop period. With reference to FIG. 7, when the process is started, hybrid control unit 62 determines whether or not engine 2 is stopped, based on, for example, the engine speed (step S41). If the engine speed is not 0, hybrid control unit 62 determines that engine 2 is not stopped. In this case (NO in step S41), the whole process is terminated. On the other hand, if the engine speed is 0, hybrid control unit 62 determines that the engine is stopped. In this case (YES in step S41), hybrid control unit 62 obtains date and time information transmitted from date and time information transmitting unit 45A (step S42). This information is kept within hybrid control unit 62 until a below-described process in step S44 is performed.

Next, hybrid control unit 62 determines whether or not the driver has instructed stop of hybrid vehicle 1A (step S43). If the driver has instructed stop of the vehicle (YES in step S43), hybrid control unit 62 causes storage unit 66 to store the date and time information obtained in step S42 and indicating the date and time of the engine stop (step S44). When the process in step S44 ends, hybrid vehicle 1A is stopped. Thereafter, battery B mounted on hybrid vehicle 1A is charged.

In step S45 coming after step S44, hybrid control unit 62 determines whether or not the driver has instructed start of hybrid vehicle 1A. If the driver has instructed start of hybrid vehicle 1A (YES in step S45), hybrid control unit 62 reads out from storage unit 66 the date and time information indicating the date and time of the engine stop (step S46).

Then, from date and time information transmitting unit 45A, hybrid control unit 62 obtains date and time information indicating the current time (step S49). Based on the obtained date and time information and the date and time information stored in storage unit 66, hybrid control unit 62 calculates the engine stop period (step S50). When the process in step S50 ends, the whole process goes back to step S49.

It should be noted that if stop of the vehicle has not been instructed in step S43 (NO in step S43), hybrid control unit 62 obtains date and time information indicating the current time, from date and time information transmitting unit 45A (step S47). Based on the obtained date and time information and the date and time information stored in storage unit 66, hybrid control unit 62 calculates the engine stop period (step S48). When the process in step S48 is ended, the whole process goes back to step S43.

It should be also noted that the processes in steps S47, S48 and the processes in steps S49, S50 are repeated whenever a fixed period of time (for example, one minute) elapses.

In this way, according to the second embodiment, control device 14A obtains the date and time information externally to calculate the engine stop period. According to the second embodiment, the process for calculation of the engine stop period can be facilitated.

Third Embodiment

The configuration of a hybrid vehicle according to a third embodiment is the same as that of hybrid vehicle 1 shown in FIG. 1 or hybrid vehicle 1A shown in FIG. 5. Also, the configuration of a control device provided in the hybrid vehicle according to the third embodiment is the same as that of control device 14 of FIG. 2 or control device 14A of FIG. 6. Accordingly, referring to FIG. 1, FIG. 2, and the like appropriately, the third embodiment will be explained below.

In the third embodiment, if the stop period of the engine is equal to or longer than a predetermined period and start of engine 2 is required within a certain period of time from the present moment, hybrid control unit 62 starts pump 186 to circulate fuel FL.

With reference to FIG. 2, when hybrid control unit 62 determines, based on, for example, information from GPS antenna 50 and gyrosensor 52, that hybrid vehicle 1 is heading for an entrance of an expressway, hybrid control unit 62 starts the pump. Hybrid control unit 62 may start the engine when onboard ETC device 54 receives a radiowave from an antenna provided in the entrance (tollgate) of the expressway. In this case, onboard ETC device 54 transmits to hybrid control unit 62 information indicating that the radiowave has been received.

First, hybrid control unit 62 starts pump 186 to circulate the fuel, and then starts engine 2. For example, if engine 2 has been stopped for a long time, fuel may cause rusting in a pipe. Such a problem can be prevented by returning all the fuel in the pipe to the fuel tank, but this may make it impossible to supply fuel to engine 2 immediately when the traveling mode of the hybrid vehicle is set at the HV traveling mode. When immediate start of the engine is impossible, the traveling of the hybrid vehicle may be influenced.

According to the third embodiment, when engine start is expected, i.e., when there is a need for engine start, fuel is circulated in advance. This enables quick engine start when the traveling mode of the hybrid vehicle is switched from the EV traveling mode to the HV traveling mode.

FIG. 8 is a flowchart illustrating a fuel circulating process according to the third embodiment. With reference to FIG. 8 and FIG. 2, when the process starts, hybrid control unit 62 determines whether or not the traveling mode of the hybrid vehicle 1 is the EV traveling mode, based on information from traveling mode-setting unit 64 (step S51). If the traveling mode of hybrid vehicle 1 is not the EV traveling mode, i.e., if the traveling mode of the hybrid vehicle 1 is the HV traveling mode (NO in step S51), the whole process is terminated. If the traveling mode of hybrid vehicle 1 is the EV traveling mode (YES in step S51), the process goes to step S52.

In step S52, hybrid control unit 62 determines whether or not the engine will be started within a certain period of time from the present moment (for example, within a period of time from the present moment to a few seconds later or a period of time from the present moment to a few minutes later). For example, hybrid control unit 62 determines that hybrid vehicle 1 is heading for an entrance of an expressway, based on information from the navigation system (or onboard ETC device 54). In this case, hybrid control unit 62 determines that the engine will be started after passage of the certain period of time from the present moment.

If hybrid control unit 62 determines that engine 2 will be started within the certain period of time from the present moment (YES in step S52), it determines whether or not the stop period of engine 2 is equal to or longer than a predetermined period (step S53). Hybrid control unit 62 performs the process shown in FIG. 6 or FIG. 7 to calculate the stop period of engine 2.

If the stop period of engine 2 is equal to or longer than the predetermined period (YES in step S53), hybrid control unit 62 starts pump 186 to circulate fuel FL (step S54). When the process in step S54 ends, the whole process is terminated. On the other hand, if the stop period of the engine is shorter than the predetermined period (NO in step S53), the whole process is terminated.

It should be noted that if it is NO in step S52, i.e., if hybrid control unit 62 determines that there is no need for engine start within the certain period of time from the present moment, the whole process is also terminated.

Thus, in the third embodiment, fuel is circulated prior to start of engine 2 to prevent delay in delivering fuel. This enables quick engine start when the traveling mode of the hybrid vehicle is switched from the EV traveling mode to the HV traveling mode.

In the third embodiment, fuel is circulated if engine start is expected in advance. In other words, in the third embodiment, fuel is circulated if each of the following conditions is satisfied: a condition that the traveling mode is the EV traveling mode, a condition that the engine will be started within the certain period of time from the present moment, and a condition that the engine stop period is equal to or longer than the predetermined period. However, the fuel pump may be started if no forecast about engine start is made in advance, the traveling mode is the EV traveling mode, and the engine stop period is equal to or longer than the predetermined period. In this way, degradation of fuel in the pipe or the pump or deterioration of the pipe and the pump can be suppressed without evoking a sense of discomfort in a user, as compared with a case of starting the fuel pump when the vehicle has been stopped.

The present embodiment has described the present invention applied by way of example to a series/parallel type hybrid system in which the motive power of the engine can be split by a power split device for transmission to an axle and a generator. However, the present invention can be applied to a series type hybrid vehicle in which the engine is used only for driving the generator and the driving power for the axle is produced only by means of a motor which employs electric power generated by the generator. In the series type hybrid vehicle, the battery alone may not be enough to supply electric power to the motor in the case of driving the motor according to a driving request. In this case, the engine is started to cause the generator to generate electric power, and the sum of electric power of the battery and electric power generated by the generator is supplied to the motor. The engine is also started when the value indicating the battery as SOC is decreased.

Further, the present invention can also be applied to a parallel type hybrid vehicle in which wheels are driven directly by the engine and motor. In the parallel type hybrid vehicle, the motor assists with the motive power of engine as well as serving as a generator for charging the battery. The parallel type hybrid vehicle can travel with the battery being charged by the generator.

The series type hybrid vehicle and parallel type hybrid vehicle both have an operating mode of bringing the engine into an operating state and an operating mode of stopping the engine and bringing the motor into an operating state. Accordingly, the present invention is also applicable to these vehicles.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A hybrid vehicle, comprising:
   a rotating electrical machine for generating torque to drive a wheel;
   an internal combustion engine for performing at least one of driving of said wheel and supply of motive power to said rotating electrical machine;
   a fuel tank for storing fuel for said internal combustion engine;
   a circulation system for taking out said fuel from said fuel tank, and for returning to said fuel tank said fuel thus taken out; and
   a control device for controlling the hybrid vehicle such that when a state of the hybrid vehicle satisfies a predetermined condition, the hybrid vehicle travels as an electrical vehicle with said wheel driven by said rotating electrical machine while said internal combustion engine is stopped, and for driving said circulation system to circulate said fuel when said internal combustion engine has been stopped for at least a predetermined period.

2. The hybrid vehicle according to claim 1, wherein said control device drives said circulation system while the hybrid vehicle travels as an electrical vehicle.

3. The hybrid vehicle according to claim 2, wherein when said control device expects that there is a need for start of said internal combustion engine based on the state of the hybrid vehicle, said control device causes said circulation system to operate.

4. The hybrid vehicle according to claim 1 further comprising a power storage device being charged with electric power supplied from a power supply provided externally to the hybrid vehicle, and for supplying electric power to said rotating electrical machine.

\* \* \* \* \*